No. 826,108. PATENTED JULY 17, 1906.
J. MATHERS.
ROCK DRILL.
APPLICATION FILED SEPT. 22, 1905.
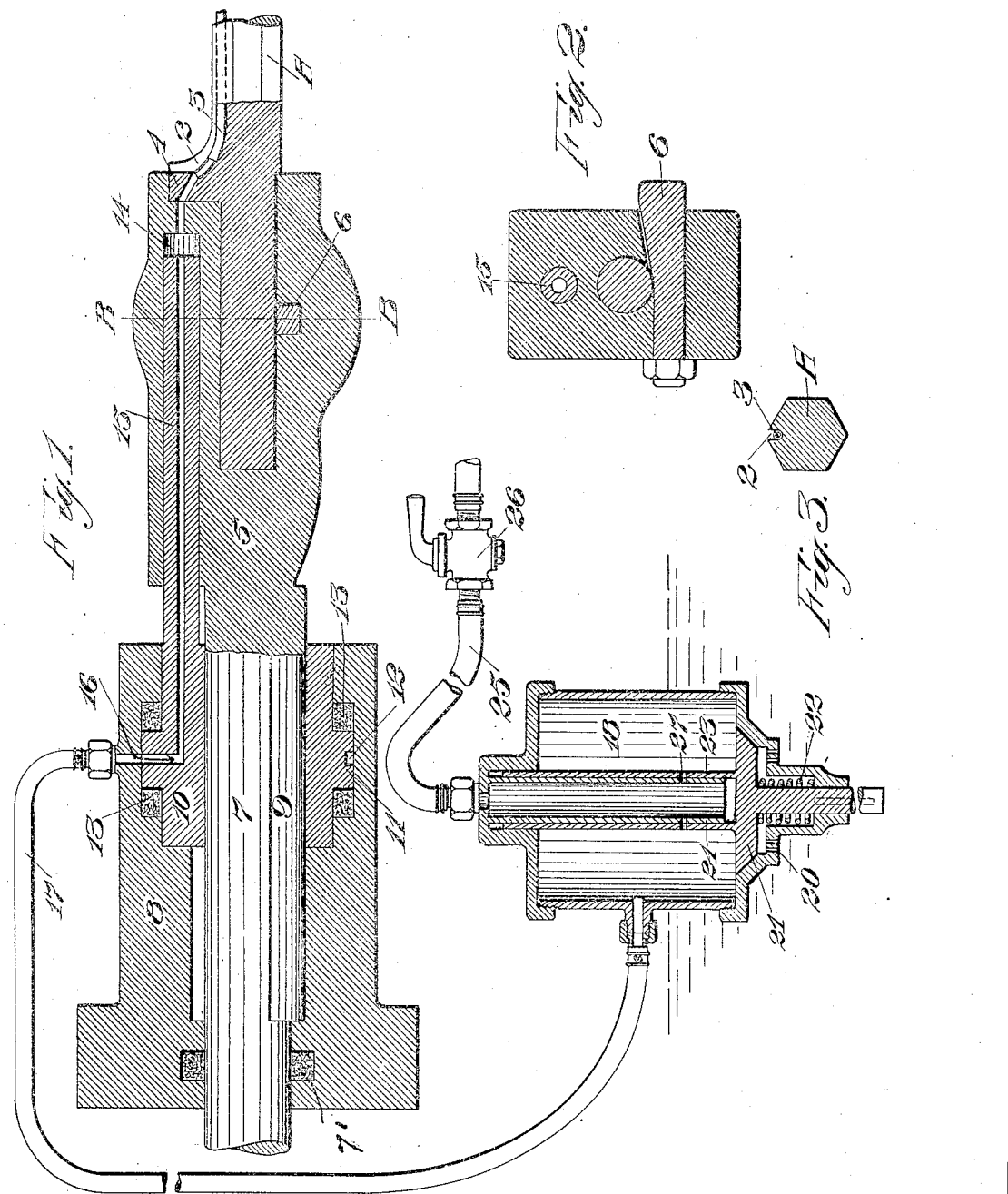

UNITED STATES PATENT OFFICE.

JAMES MATHERS, OF SAN FRANCISCO, CALIFORNIA.

ROCK-DRILL.

No. 826,108.  Specification of Letters Patent.  Patented July 17, 1906.

Application filed September 22, 1905. Serial No. 279,602.

*To all whom it may concern:*

Be it known that I, JAMES MATHERS, a citizen of the United States, residing in the city and county of San Francisco and State of California, have invented new and useful Improvements in Rock-Drills, of which the following is a specification.

My invention relates to improvements in rock-drills, and particularly to means for supplying water in the bottom of the drill-hole; and my invention consists of the parts and the constructions and combinations of parts, which I will hereinafter describe and claim.

It also comprises details of construction which will be more fully explained by reference to the accompanying drawings, in which—

Figure 1 is a longitudinal section of the device. Fig. 2 is a transverse section through B B, Fig. 1. Fig. 3 is a transverse section of the drill-shank and tube.

In the operation of rock-drills it is desirable to supply water in the drill-hole to assist in the more rapid operation of drilling. Various devices have been employed for this purpose. In my invention I form the drill A with a groove or channel upon one side, as at 2. Within this groove or channel is fitted a small tube 3, the channel being undercut, so that the tube may be slightly flattened or compressed and held rigidly in place.

The tube may extend to a point sufficiently near the cutting end of the drill to insure water being delivered to the bottom of the hole, and it is sufficiently shorter than the length of the drill so that it will not be affected by the heating required in sharpening the drills.

The upper end of the tube enters a socket 4, which is welded or otherwise secured at the upper end of the drill and near to the point where the drill enters the chuck or clamp 5.

The cylindrical end of the drill fits in a correspondingly-shaped socket in the chuck and may be secured by a wedge-shaped key or bolt 6, which is driven in transversely at one side of the drill end and may be secured by a nut upon the screw-threaded end of the wedge-shaped bolt.

A stem or shank 7 extends backwardly into the head 8, within which it is slidable, and it has a segmental feather 9 fixed upon it.

10 is a collar or head turnable in channels cut in the head 8 and having a keyway passing through it, which fits the segmental feather 9, so that the drill may be turned by the usual ratchet or equivalent mechanism, which will turn the shank or rod 7 and by means of the feather 9 will turn the head 10, at the same time allowing the shank to be reciprocated through the head without advancing said head by reason of the impulses given by the pressure upon the piston within the cylinder, which is of the usual character. Around the head 10 is a larger portion 11, having a groove made in it, as at 12. Upon each side of this enlarged portion 11 are packing-rings 13, which, fitting in a groove or channel in which this portion of the head 10 turns, make a tight joint around the head, while allowing the drill-chuck to be reciprocated and turned, as previously described. A similar packing-ring 7' may be employed to make a tight joint around the shank 7.

The end of the tube 3 fits and corresponds with a groove or channel 14, which is made in the corresponding side of the chuck or clamp 5, and a tube 15 extends from the collar or head 10 into this groove or channel, the tube being stationary with the collar. The chuck 5 will slide upon the tube in unison with the reciprocations of the drill. The inner end of this tube enters or connects with a passage within the collar 10, and this passage is connected by a radial hole 16 with the groove 12 in the part 11 of the collar, so that there is open communication from this groove through the passages heretofore described to the end of the drill, and it will be seen that by reason of the annular channel 12 the collar or head 10 may be constantly rotated in unison with the rotation of the drill, and an open passage will always be maintained through this annular channel and through a pipe or passage 17, which opens into the head 8, within which the collar is contained. In order to supply water through these passages, I have shown a chamber 18. One side of this chamber has a hose extending from it to the connection 17.

The chamber has screen-openings made in one end, as shown at 20, and a valve 21 adapted to seat over these openings when under pressure. The valve is normally held open by a spring 22, and when thus opened the chamber being submerged in water will be filled with the water through these openings. The valve has a sleeve 23, which fits and is slidable upon a tube 24, and this tube extends into the head opposite to the valve and is in connection with a hose 25, connecting with this end of the chamber. This hose connects with the source of air-supply and has a controlling-cock, as at 26.

The inner tube 24 has holes made in it, and similar holes are made through the sleeve 23, and these holes register when the valve is closed. The valve-stem fits and is slidable upon a feather fixed in a tubular extension from the perforated or foraminous head, and thus maintains the register of the small holes 27, previously referred to.

The operation will then be as follows: The valve is normally held open by a spring 22, so that water may enter the submerged casing and fill it, the air-pressure through the supply-hose being cut off by closing the cock 26. When it is desired to introduce water into the drill-hole, air is admitted through the supply-hose and entering through the passages heretofore described will by its pressure close the valve and prevent any escape of water through the foraminous inlet. The small holes in the interior air-pipe and the sleeve of the valve-stem being then in register, air will escape through these holes and will force the water from the chamber through the hose 17, and thus through the connections heretofore described water will be admitted into the drill-hole. The supply of water is controlled by controlling the air-pressure within the chamber containing the water, and it may be cut off at any time. When thus cut off, the valve 21 will again open and allow the chamber to refill, thus the chamber being submerged will be constantly supplied with water whenever the air-pressure thereto is cut off, and by opening the cock controlling the air-supply the water will be forced into the drill-hole.

Having thus described my invention, what I claim, and desire to secure by Letters Patent, is—

1. In a rock-drill, means for supplying water to the drill-hole, said means consisting of a pipe, a drill-shank having a channel within which the pipe is fitted, a socket member at the head of the shank, a chuck into which the drill-shank and socket member are inserted, a pipe upon which the chuck is slidable, said pipe being in open communication with the socket member and the pipe which is fitted to the drill-shank, and means for supplying water to the pipe upon which the chuck is slidable.

2. In a rock-drill, a channeled drill-shank, a pipe embedded in the channel, a reciprocating chuck to which the drill-shank is secured, said chuck having a channel at one side of the drill-shank and with which the water-conducting pipe of the shank connects, a head embracing the shank of the chuck and a collar turnably mounted in said head, a pipe extending from the collar into the water-channel of the chuck, upon which pipe the chuck is slidable, and means for supplying water through the collar to said pipe.

3. In a rock-drill the combination of a channeled drill-shank, a drill-chuck, a head or casing having an enlarged circular chamber, a collar fitting and turnable in said chamber and having a channel or groove around its central portion, a water-conducting pipe extending from the collar into the drill-chuck and having open communication with the channel of the collar, a pipe located in one side of the drill-shank and extending to near the chuck end, said pipe connecting with the interior of the chuck in line with the water-conducting pipe, said chuck being reciprocable with relation to the collar and its casing.

4. In a rock-drill, the combination of a head or casing having an enlarged circular chamber within it, a collar fitting and turnable within said chamber, a drill-shank and a chuck at one end thereof having a shank passing through said collar, a feather upon the shank slidable in a corresponding slot or channel in the collar whereby the two are turnable in unison with the turning of the drill, said collar having, also, a circumferential groove or channel, means for supplying water through the casing into said circumferential groove, a pipe fixed to the collar and extending into the drill-chuck, upon which pipe the chuck and drill are reciprocable, connections between the groove of the collar and the interior of said pipe, and a pipe embedded in the drill-shank extending to near the cutting end, said last-named pipe being in open communication with the conducting passage of the chuck.

5. In a rock-drill, the combination of a head or casing having an enlarged circular chamber within it, a collar turnable in said chamber, a chuck having a shank passing through the center of the collar and the casing, said chuck having an opening in one side, a feather upon the shank slidable therewith through the collar whereby said collar is turnable in unison with the shank, packing-rings making a water-tight joint around the collar and shank, said collar having a circumferential groove between the packing-rings, and said casing having a passage through which water is supplied to said groove, a drill fixed in the chuck having a groove or passage in one side, a water-conducting pipe embedded in the said groove of the drill, and connecting with the interior of the chuck at one side of the drill-shank, a pipe fixed to the collar in line with said opening in the chuck, and upon which the chuck is slidable whereby water may be introduced through the connecting-passages to the bottom of the drill-hole.

6. In a rock-drill, the combination of a fixed casing, a shank slidable therethrough and having a feather fixed to it, said casing having an enlarged circular chamber, a flanged head turnably mounted in said chamber, means for making tight joints around the shank and flanged portion of the head, a chuck and a drill secured therein carried by the shank, a pipe projecting from the head, said chuck having a tubular channel in one side fitting and slidable on said pipe, a pipe embedded in the shank of the drill and opening near the cutting-bits, and connecting with said pipe projecting from the head, said head having its flanged portion provided with a groove or channel which connects with said projecting pipe, a water-conducting pipe connecting with said groove or channel, and means for intermittently supplying water thereto.

7. An apparatus for supplying water in the the holes of rock-drills, said apparatus comprising a drill-shank, a chuck therefor pipe embedded in the drill-shank and discharging near the cutting-bits, a collar revoluble in a fixed casing, slidable pipe connections between said collar and the drill-chuck and tube in the drill-shank, said collar having a groove in its periphery connecting with the conducting-pipe, and pressure means whereby water is periodically delivered to the drill-hole under pressure.

In testimony whereof I have hereunto set my hand in presence of two subscribing witnesses

JAMES MATHERS.

Witnesses:
S. H. NOURSE,
M. G. REDDY.